United States Patent
Safreed et al.

(10) Patent No.: US 10,536,693 B2
(45) Date of Patent: Jan. 14, 2020

(54) ANALYTIC REPROCESSING FOR DATA STREAM SYSTEM AND METHOD

(71) Applicant: Pixvana, Inc., Seattle, WA (US)

(72) Inventors: Sean Safreed, Seattle, WA (US); William Hensler, Seattle, WA (US); Forest Key, Seattle, WA (US); Scott Squires, Studio City, CA (US)

(73) Assignee: Pixvana, Inc., Seattle, WA (US)

( * ) Notice: Subject to any disclaimer, the term of this patent is extended or adjusted under 35 U.S.C. 154(b) by 34 days.

(21) Appl. No.: 15/821,185

(22) Filed: Nov. 22, 2017

(65) Prior Publication Data

US 2018/0146193 A1    May 24, 2018

Related U.S. Application Data

(60) Provisional application No. 62/425,604, filed on Nov. 22, 2016, provisional application No. 62/428,392, (Continued)

(51) Int. Cl.
*H04N 19/00* (2014.01)
*H04N 19/115* (2014.01)
(Continued)

(52) U.S. Cl.
CPC ............ *H04N 19/115* (2014.11); *G06F 3/011* (2013.01); *G06F 3/012* (2013.01); *G06F 3/013* (2013.01);
(Continued)

(58) Field of Classification Search
CPC ............. H04N 5/00; H04N 7/00; H04N 19/00
See application file for complete search history.

(56) References Cited

U.S. PATENT DOCUMENTS

2010/0007582 A1* 1/2010 Zalewski ............... A63F 13/00
                                                                345/8
2011/0214072 A1   9/2011 Lindemann et al.
(Continued)

OTHER PUBLICATIONS

Blum, T. et al., "The Effect of Out-of-focus Blur on Visual Discomfort when Using Stereo Displays," IEEE International Symposium on Mixed and Augmented Reality, Oct. 2010, pp. 13-17.
(Continued)

*Primary Examiner* — Maryam A Nasri
(74) *Attorney, Agent, or Firm* — Fenwick & West LLP

(57) ABSTRACT

A head mounted display (HMD) identifies viewing trends for a video based on multiple viewings of the video by users having different user characteristics. The analysis identifies viewing trends based on user characteristics, e.g., the age and gender of the user. When a subsequent user is viewing the video, a production & post production module receives the user's profile information and identifies the predicted viewing location of the user at particular times during the video using the identified trends based on where previous users/viewers, who have a profile or characteristics similar to the user, were looking at the particular times during the video. The production & post production module identifies the center tile as the predicted viewing location at a particular time for the user and prepares and encodes the video stream based on the predicted viewing location and, for example, streams the video to the HMD in which the predicted viewing location is the center tile at the associated time in the video. This can increase the effectiveness of the data transmitted to the HUD.

14 Claims, 13 Drawing Sheets

Related U.S. Application Data filed on Nov. 30, 2016, provisional application No. 62/428,399, filed on Nov. 30, 2016.

(51) Int. Cl.

| | | |
|---|---|---|
| *H04N 19/167* | (2014.01) | |
| *H04N 19/597* | (2014.01) | |
| *H04N 19/162* | (2014.01) | |
| *H04N 13/139* | (2018.01) | |
| *H04N 13/344* | (2018.01) | |
| *H04N 13/383* | (2018.01) | |
| *H04N 13/106* | (2018.01) | |
| *G06F 3/01* | (2006.01) | |
| *G06F 3/0484* | (2013.01) | |
| *H04N 5/232* | (2006.01) | |
| *H04N 19/172* | (2014.01) | |
| *G06T 7/11* | (2017.01) | |
| *G06T 7/174* | (2017.01) | |
| *G06T 5/00* | (2006.01) | |
| *H04N 1/64* | (2006.01) | |
| *H04N 19/119* | (2014.01) | |
| *H04N 19/137* | (2014.01) | |
| *G06T 5/50* | (2006.01) | |
| *G06T 19/00* | (2011.01) | |
| *H04N 19/17* | (2014.01) | |
| *G06T 3/40* | (2006.01) | |

(52) U.S. Cl.
CPC ............ *G06F 3/0484* (2013.01); *G06T 5/002* (2013.01); *G06T 5/50* (2013.01); *G06T 7/11* (2017.01); *G06T 7/174* (2017.01); *G06T 19/006* (2013.01); *H04N 1/646* (2013.01); *H04N 5/23238* (2013.01); *H04N 13/106* (2018.05); *H04N 13/139* (2018.05); *H04N 13/344* (2018.05); *H04N 13/383* (2018.05); *H04N 19/119* (2014.11); *H04N 19/137* (2014.11); *H04N 19/162* (2014.11); *H04N 19/167* (2014.11); *H04N 19/172* (2014.11); *H04N 19/597* (2014.11); *G06T 3/4023* (2013.01); *G06T 2207/20192* (2013.01); *G06T 2207/20221* (2013.01); *G06T 2219/024* (2013.01); *H04N 19/17* (2014.11)

(56) References Cited

U.S. PATENT DOCUMENTS

| | | | |
|---|---|---|---|
| 2013/0128957 | A1 | 5/2013 | Bankoski et al. |
| 2015/0304665 | A1 | 10/2015 | Hannuksela et al. |
| 2016/0026253 | A1 | 1/2016 | Bradski et al. |
| 2017/0248796 | A1 | 8/2017 | Banks et al. |
| 2017/0374375 | A1* | 12/2017 | Makar .................. H04N 19/126 |
| 2018/0089903 | A1 | 3/2018 | Pang et al. |

OTHER PUBLICATIONS

Rao, G. et al., "[Poster] Reactive Displays for Virtual Reality," 2017 IEEE International Symposium on Mixed and Augmented Reality Adjunct Proceedings, Oct. 2017, pp. 63-68.

Schönauer, C. et al., "3D Building Reconstruction and Thermal Mapping in Fire Brigade Operations," Interactive Media Systems Group, 2013, two pages.

United States Office Action, U.S. Appl. No. 15/821,527, dated Jan. 29, 2019, 18 pages.

United States Office Action, U.S. Appl. No. 15/821,529, dated Jan. 29, 2019, 19 pages.

* cited by examiner

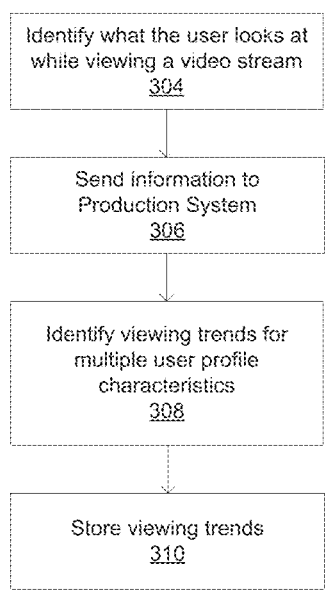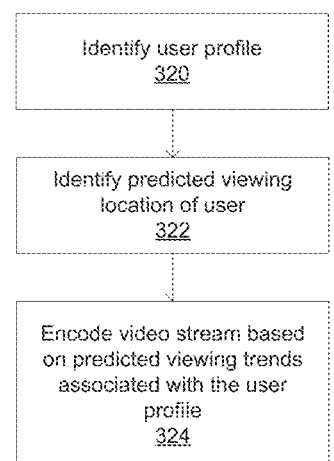
FIG. 3a
FIG. 3b

ANALYTIC REPROCESSING FOR DATA STREAM SYSTEM AND METHOD

RELATED APPLICATIONS

This application claims priority from U.S. provisional application No. 62/425,604 filed on Nov. 22, 2016, U.S. provisional application No. 62/428,392 filed on Nov. 30, 2016, and U.S. provisional application No. 62/428,399 filed on Nov. 30, 2016, which are all incorporated by reference herein in their entirety.

This application is related to U.S. patent application Ser. No. 15/821,527, filed Nov. 22, 2017 titled Variable Image Data Reduction System and Method and U.S. patent application Ser. No. 15/821,529, filed Nov. 22, 2017 titled System and Method for Data Reduction Based on Scene Content, which are all incorporated by reference herein in their entirety.

FIELD

The application relates to image processing and more particularly to analyzing video streams and predicting viewing location within the data stream.

BACKGROUND

When transmitting information to head mounted displays (HMD) transmission speeds can limit the amount of data that can be received which can result in lower resolution images being displayed on the HMD.

SUMMARY OF THE EMBODIMENTS

A head mounted display (HMD) identifies the location where the user is looking while viewing the video stream. This location information is stored in a production system 120 that also analyzes the data from multiple users/HMDs to identify viewing trends for the video. The analysis may also identify viewing trends based on user characteristics, e.g., the age and gender of the user.

When a user is viewing the video, the production & post production module receives the user's profile information and identifies the predicted viewing location of the user at particular times during the video using the identified trends based on where previous users/viewers, who have a profile or characteristics similar to the user, were looking at the particular times during the video. The production & post production module identifies the center tile as the predicted viewing location at a particular time for the user and prepares and encodes the video stream based on the predicted viewing location and, for example, streams the video to the HMD in which the predicted viewing location is the center tile at the associated time in the video. This can increase the effectiveness of the data transmitted to the HUD.

A method for encoding a first video stream, comprising the steps of: identifying a first set of user characteristics for a first user, predicting a predicted viewing location for said first user at a first time of the first video stream; and encoding a first portion of the first video stream based upon said predicted viewing location. In an embodiment, the encoded first portion of the first video stream includes said first time of the first video stream. In another embodiment, the predicted viewing location is the location in the first video stream where the first user is predicted to look during said first time. In another embodiment, the predicted viewing location is identified as a center tile and wherein said encoding step encodes said predicted viewing location using a lower compression rate than a second location of said video stream at said first time. In another embodiment, the predicting step comprises: identifying a second set of characteristics corresponding to said first set of characteristics; and identifying said predicted viewing location, based on previous viewing locations for the first video stream at said first time by users having said second set of characteristics. In an embodiment the first and second set of characteristics are the same. In an embodiment, there are additional steps of identifying an actual viewing location of said first user at a first time of the first video stream; and including said actual viewing location as a previous viewing location for subsequent users who subsequently view the first video.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

BRIEF DESCRIPTION OF THE DRAWINGS

FIGS. 3a-b are flow charts showing methods of identifying viewing trends and predicting viewing locations based on those trends to enhance the user's field of view in accordance with an embodiment.

The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED DESCRIPTION

Overview

A production system determines areas of a streaming video stream that a user is likely to look at during various portions of the video provides higher quality/resolution images for those areas. The production system may also switch in, add, and/or update content of the master video file with a new file package or content. In some embodiments, the new content can be an advertisement or other message that can change over time, based on user information, etc.

System Overview

Figure 1:
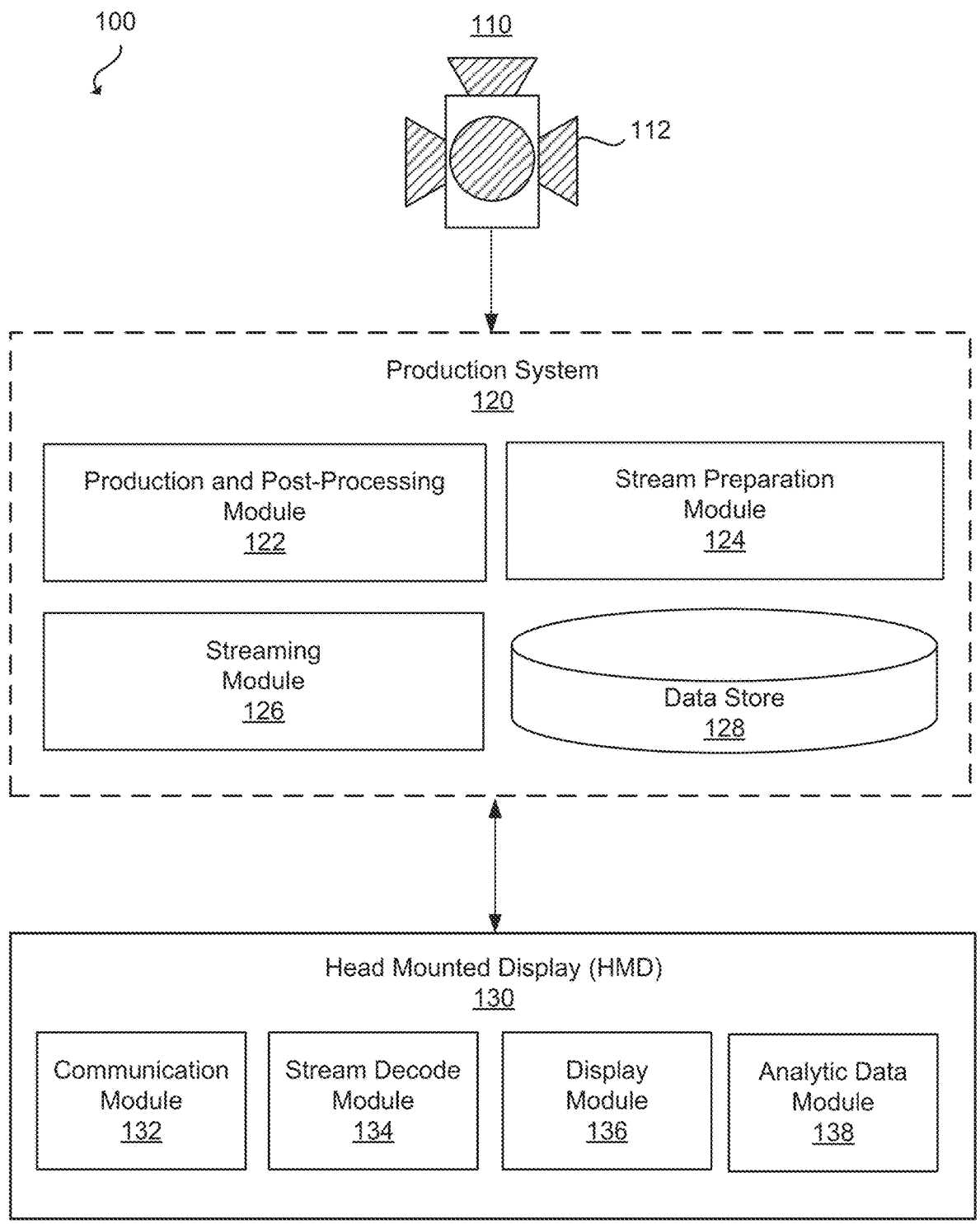
FIG. 1 shows an example system in which audio and video content is prepared for consumption in a head mounted display (HMD) or other computing device, in accordance with at least one embodiment.

FIG. 1 shows system 100 in which audio and video content is prepared for consumption in head mounted display (HMD) or other computing device. In this example, system 100 includes image capture rig 110, production system 120, and HMD 130. While FIG. 1 shows a single image capture rig 110, a single production system 120, and a single HMD 130, in other embodiments, any number of these components may be included in the system and, in alternative configurations, different and/or additional components may also be included in system 100. For example, there may be multiple HMDs 130 each having an associated console, input interface, and being monitored by one or more imaging devices.

Image capture rig 110 includes one or more cameras with either a wide field of view (FOV) or each having overlapping field of views (FOVs) relative to other cameras in a rig. In this example, FIG. 1 shows image capture rig 110 with multiple cameras 112. Each camera 112 is mounted in image capture rig 110 to capture individual images of a different FOV that overlaps with the fields of view of adjacent cameras 112. The individual images are subsequently stitched together based on their overlapping fields of view to cover a wide FOV (e.g., 180° to 360°) that is larger than any one camera 112. Image capture rig 110 can alternatively be a single wide angle camera built specifically for virtual reality (VR) and/or augmented reality (AR) applications that is capable of capturing images at a wide FOV. Accordingly, image capture rig 110 captures images in a sequence (e.g., frames of video) via cameras 112 and provides the images to production system 120.

Production system 120 obtains the images captured via cameras 112 from image capture rig 110 and prepares the video file for delivery to HMD 130 (and subsequent consumption by a user of HMD 130). Production system 120 includes production and post-processing module 122, stream preparation module 124, streaming module 126, and data store 128. Production and post-processing module 122 stitches images obtained from image capture rig 110 to create a master negative for each frame of a master video file that covers the wide FOV from a combination of cameras 112 of image capture rig 110. Thus, the master negative is produced by stitching multiple videos and eliminating distortion and aberrations, which results in a high resolution, multi-camera captured, stitched file of 10-20k+ horizontal resolution. Stream preparation module 124 prepares the master video file for delivery through one or more streaming protocols to HMD 130. Since decoding of the master video file requires a particular size and data rate, the master video file is converted into a format best suited to HMD 130 (e.g., resolution of the headset, video decode performance of the headset, etc.) and transmission speed of the network between production system 120 (or whatever system eventually steams the master file) and HMD 130. Streaming module 126 iteratively engages HMD 130 with a machine learning process to deliver the master video file to HMD 130. Data store 128 stores the master video file and the various format specifications and requirements for delivering the master video file to HMD 130, other HMDs, and/or other computing devices. Production and post-processing module 122, stream preparation module 124, and streaming module 126 will be further described with respect to FIG. 2.

HMD 130 presents virtual and/or augmented reality content to a user. Example content includes images, video, audio, text, or some combination thereof. During content playback, HMD 130 may manage buffering of each chunk of frames, caching resources locally to cover the FOV determined via positional tracking. Audio content may be presented via a separate device (e.g., speakers and/or headphones) external to HMD 130 that receives audio information from HMD 130, a console associated with HMD 130, or both. HMD 130 includes communications module 132, stream decode module 134, display module 136, and analytic data module 138. HMD 130 may include fewer or more modules than those shown in FIG. 1.

Communications module 132 establishes a communication channel with production system 120 by sending a request for content and then receives the content production system 120. Communication module 132 may send multiple inputs requests based on the expected head motion and playback time in order to receive the correct content for the user's viewing location.

Stream decode module 134 receives the content via communications module 132 from production system 120 (or one or more remote servers associated with production system 120) and decodes the video, audio, subtitle data for each frame from a data stream. The content decoded by stream decode module 134 may also include a displacement map or a depth map for the content, stereo information, and auxiliary information for user interaction. Further, since content for the right eye in stereo is only slightly different than the content for the left eye, difference or displacement information or data can be provided for each frame of content. Thus, from image data for a single perspective, the two perspectives required for stereo imagining can be generated using the image data for the single perspective with the difference or displacement data.

Display module 136 manages operation of an electronic display screen that presents the content (e.g., visual information) of the master video file decoded by stream decode module 134. The electronic display screen may be a liquid crystal display (LCD), an organic light emitting diode (OLED) display, and so forth. Further, display module 136 may optionally apply sharpening and/or a color transform of the content that is particular to the specifications of HMD 130 before presenting the content to the user.

Analytic data module 138 iteratively engages production system 120 with a machine learning process to facilitate the delivery and correct specification of the master video file to HMD 130. In one embodiment, at the time of playback and for each frame, analytic data module 138 caches and sends analytical data to production system 120 about the position of HMD 130, the motion during the playback of each frame, a gaze direction of the user as supplied by eye-tracking system. The data rate of analytic data provided to production system 120, in one embodiment matches the temporal resolution of the tracking accuracy of HMD 130 (e.g., every 1/90th of a second provides a position and vector of motion). This analytic stream will be captured and transmitted back to production system 120 for analysis.

Initially, for new master video files, production system 120 does not possess information for where in a scene users tend to look or what objects tend to dominate the gaze direction, viewing location, or attention of users. Thus, analytic data module 138 may additionally track the motion and directional view of the users, aggregate this data for all users to determine where in the FOV or scene user's tend to look, and encodes the data stream of the master video file to prioritize providing locations in the FOV in relatively high quality during content delivery. In one embodiment, the result is a new set of output tiles and/or playlist driven by aggregate the viewing habits of users for any piece of content.

Figure 2:
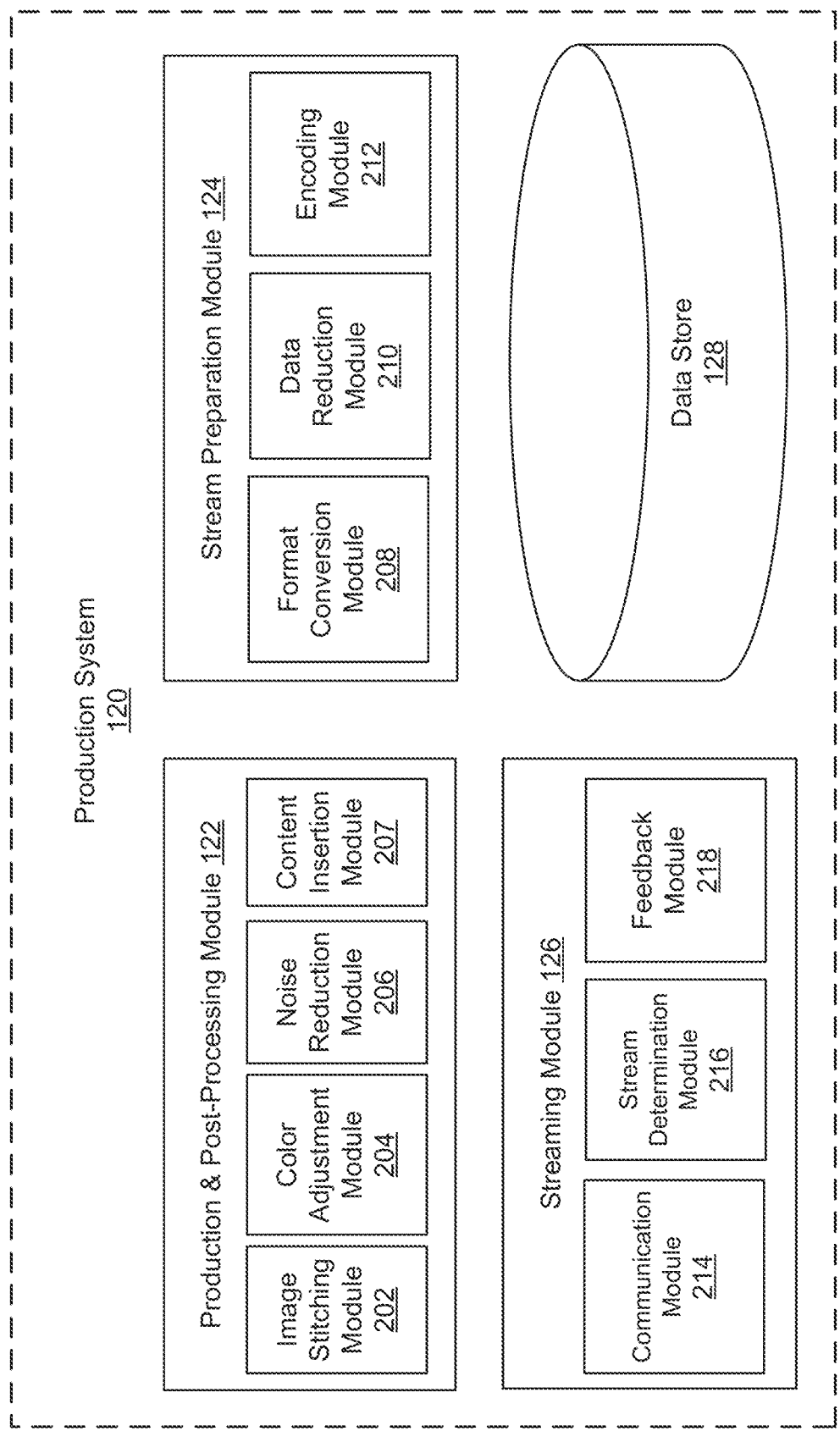
FIG. 2 shows an example production system, in accordance with at least one embodiment.

FIG. 2 shows production system 120 including production and post-processing module 122, stream preparation module 124, and streaming module 126. The following description of production system 120 describes modules, components, techniques, and other processes of a mono processing embodiment for processing content (e.g., virtual reality content, augmented reality content). Thus, there is no stereo imagery in the origination of the content (e.g., images captured by image capture rig 110) and the view in the right and left eye of HMD 130 are the same. For stereo content, each of the following steps can be performed in parallel while separately taking into account that the left and right frames in the stereo pair are processed in parallel for representing the same temporal moment with a slight offset of viewing angle. A disparity map could be further packaged as data for each frame and sent to HMD 130 with the content as part of the stream.

Production and Post-Processing

Production and post-processing module 122 stitches images obtained from image capture rig 110 and performs a series of other processing techniques to create a master negative for each frame of the master video file. Production and post-processing module 122, in one embodiment, includes image stitching module 202, color adjustment module 204, a noise reduction module 206, and a content insertion module 207, as shown in FIG. 2.

In alternate embodiments, more or fewer modules and functions may be included in the Production and post-processing module 122. For example, modules to perform special effects, vector graphics, animations, or other production or post-processing effects that may be configurable by the end user.

Stitching module 202 receives images corresponding to frames of a video file captured by image capture rig 112. The images are received in multiple input video streams (e.g., 2 to n input video streams) each corresponding to a different camera 112 of image capture rig 110. As described above, each camera has a different FOV relative to other cameras 112 and the FOV of adjacent cameras 112 partially overlapped to allow for image registration based on the overlapping regions. Stitching module 202, thus, determines an appropriate mathematical model relating pixel coordinates in one image to corresponding pixel coordinates in another adjacent image to align the images. Since cameras 112 are fixed in image capture rig 110 relative to each other, the mathematical model relating pixel coordinates is often predetermined or known before the images are captured. Accordingly, stitching module 202 produces a stitched negative for each frame of the video file covering a wide FOV (e.g., 180° to 360°).

Color adjustment module 204 adjusts the color and other properties of the stitched negative. The images obtained from image capture rig 110 are initially in a raw (i.e., flat or log gamma) format corresponding to the native color space of cameras 112 and (after the images are stitched together) the stitched negative is processed or converted to a standard color space for video processing (e.g., Rec 709, DCI P3, Rec 2020, etc.) depending on device intention and processing. Color adjustment could alternatively be performed prior to image stitching or other processes discussed herein as well. Further, the stitched negative could be gamma converted to linear color space appropriate for downstream effects and compositing. Color adjustment module 204 also performs color correction to enhance the contrast, shift the white balance, provide creative looks to better match a creative intent, and/or add glows or local contrast to change the mood of a master video file.

Noise Reduction module 206 applies spatial and/or temporal noise reduction filters that remove noise. For example, noise can be based on heuristics that first determine a noise level and then applies a frequency based noise reduction to each frame (i.e., stitched negative) based on spatial noise characteristic and temporal motion across multiple frames (e.g., 3 frames).

Accordingly, production and post-processing module 122 stitches images obtained from image capture rig 110 to create a single video file from each input stream and performs a series of processing techniques to create the master video file for viewing by a user via HMD 130. The master video file is then further formatted based on the device type of HMD 130 and other requirements and constraints associated with streaming the master video file to HMD 130, as discussed below with respect to stream preparation module 124.

Stream Preparation

Stream preparation module 124 prepares the master video file for delivery through one or more streaming protocols to HMD 130 based on HMD 130 device type and other constraints associated with streaming the master video file to HMD 130. Stream preparation module 124, in one embodiment, includes format conversion module 208, data reduction module 210, and encoding module 212, as shown in FIG. 2.

Format conversion module 208, in one embodiment, resizes each frame of the master video file and adjusts the format of each frame of the master video file to be compatible with one or more different HMD(s) 130. Thus, each frame of the master video file is resized to fit the final format of HMD 130, which may vary by device manufacture, operating system, video player, and so forth. For example, output could be as large as 16000×8000 pixels for higher-end devices, typically in an equi-rectangular format (e.g., twice the width as the height of the frame), and the format may be 3840×1920 for mobile applications. Production system 120 can support the resizing of frames in arbitrary size and formats with varying resampling filters including bilinear, bi-cubic and elliptically weighted averaging (EWA).

Further, based on the output device, the master video file is converted into a format suitable for encoding module 212 and stream decoding module of HMD 130. Accordingly, the master video file may start in an equi-rectangular format (e.g., a horizontal length containing 360 degrees of horizontal pixel data and a vertical length containing 180 degrees of vertical pixel data) and be converted to other formats using standard warping and tiling arrangement, such as a 6-sided cube map or a cube arrangement. The cube arrangement may be passed in the other packing formats as well that including cubic, spherical, tiled pyramids, and so forth.

Standard distortion maps may be extended to include alternate packing methods that are more appropriate for encoding module 212 of the pixel data or the FOV of the master. Other distortion maps could include an unrolled cylinder for a subset of each frame of the master video file. For example, the subset of each frame could include just the middle 120 degrees of the FOV band and small squares describing the pixel data for the top and bottom of the remaining FOV. Other shapes could be set such as a pyramid with four sides and a bottom, or more exotic shapes such as hexagonal pyramids or hexagonal spheres.

Data reduction module 210 applies one or more data reduction techniques or processes to the master video file to reduce the amount of data streamed to HMD 130 while prioritizing the quality of content of the master video file based on the user's viewing location, such that the user perceives no reduction in image quality. In one embodiment, stream determination module 216 processes the master video file into a series of tiles that cover the FOV of HMD 130 using a cropping function. For example, the master video file can be cropped into eight tiles (e.g., four vertical and two horizontal slices) to cover the full FOV of each frame of the master video file. The tiles can be defined by the FOV of HMD 130 including a band of extra area (referred to as a guard band) that includes an overlapping portion of adjacent tiles, which results in fewer tiles with more coverage of the full master image.

Further, data reduction module 210 can reduce the image quality of one or more tiles by selectively blurring or averaging of pixels to reduce image detail in areas that the user will likely not be as sensitive to in order to increase compression efficiency for encoding. For example, the image quality of one or more tiles can be reduced by blurring or averaging pixels associated with an expected edge of the FOV. The selective blurring could be defined by the lens characteristics of HMD 130 to define a default area to be smoothed.

To further lower the amount of data sent to encoding module 212, data reduction module 210, in one embodiment, processes the master video file into tiles and compresses the tiles as a function of position relative to a center tile. The center tile, in this embodiment, corresponds to either a determined or predicted viewing location of the user wearing HMD 130 that will change as the user moves their head and/or eyes to view additional content of the master video file. The center tile will also likely be located at the center of the display of the HMD. The center tile may not be compressed at all (or slightly depending on network bandwidth and HMD 130 capabilities) and the other tiles are decimated as a function of distance from the center tile. In this manner, the tile corresponding to the viewing location of the user is prioritized and provided in high quality, while tiles where the user isn't looking are compressed. Since the human eye requires time to adjust and would likely not be able to focus on an object with enough particularity having, for example, just turned their head, tiles other than the center tile are initially provided at a lower quality. Accordingly, when the user moves their head, the center tile is updated and the new center tile is provided at a high quality relative to the other tiles including a previous center tile, in this example.

Tile compression or decimation, in one embodiment, is variable and can be linear or non-linear in the horizontal and/or vertically direction. Compressing the tiles as a function of position relative to a center tile or viewing location of the user can be achieved by compressing the guard band areas through variable decimation of the pixels and a transfer function can describe this process. In one example, a linear transfer function could compress the guard bands by combining or averaging pixels in a linear ratio. For example, 4 or 8 or 10 pixels are filtered to 1 pixel. In another example, a non-linear function can be applied to decimate the guard band closest to FOV by a lower ratio, such as 2 to 1, while pixels at the outer horizontal edge could be compressed to a higher ratio up to 50 to 1. Further, a less linear process could also be applied to the compression of guard bands with a 2D map describing the ratio of compression between the current FOV inside an ellipse or irregular arbitrary shape and the outer rectangular shape matching the edge of a tile.

Further, since the human eye is also not as sensitive to certain color variations and textures, additional decimation for color space and based on a frequency analysis of the image can be applied. The image blurring could also take into account scene content so that less blurring is applied in areas of higher detail and more blurring is applied to areas of lower detail where the detail is separated by frequency of the scene content.

Accordingly, once the tiles are distorted into a final format, each tile is sent in the resized format to be packaged as a streaming video set. This process is used to prepare encoding module 212 for multiple resolutions depending on network bandwidth between production system 120 and HMD 130. Further, referring back to color adjustment module 204 described above, color adjustment module 204 may further process the color each tile that converts the color from the master color space of the master video file to the color space of HMD 130 or devices that cannot or do not use runtime color processing to match the input master color space to the display during playback.

In another embodiment, data reduction module 210 may replace some tiles entirely by a still image, a pixel map of a solid color (e.g., black) or by an arbitrary graphic. Temporal substitution may be defined for a few frames at a time, for an entire scene of similar content (e.g., a shot) or for the entire video clip. A heuristic determining the substitution of a single image over a number of tiles can be based on the content of a scene. For example, a video of a standup comedian where a spotlight is pointed at the comedian and the rest of the frame is essentially black. In this example, the entire frame other than the area covered by the spotlight could be replaced with a black background. The area of the spot light could be identified ahead of time by an author based on the editing of the content or determined automatically for some range of the horizontal section of the original.

Some tiles may also include important scene content or content that should be provided at a high quality. For example, this important scene content can include prominent faces, human or animal figures, known landmarks (e.g., Mt. Rushmore, etc.), and so forth. A scene content map that is either author-supplied (i.e., a map detailing important areas within a scene by the author or content publisher) or generated automatically through scene analysis could provide tile splitting based on these important details and the temporal changes of the scene content across the entire FOV of the frame. Other examples include a soccer player moving across a soccer field or a singer moving against a static background. Accordingly, the tile dimensions may, thus, be changed from frame to frame depending on the scene content and/or temporal characteristic of the content.

Encoding module 212 encodes the tiles of each frame of the master video file into a stand compression codec (e.g., H.264, H.265 MPEG, VP9, etc.) that aligns with the playback system of display module 136 of HMD 130. Other codecs may be targeted depending on the playback system and the prevailing standard for HMD 130. For example, tiles might be encoded in JPEG2000 format or Google VP9 standard based on client preference and/or system capability. Each tile size in the pyramid may be encoded in multiple quality levels to serve user-defined quality settings or to adjust for the available network bandwidth of HMD 130 (standard streaming encoding strategy). Further, for stereo content with a different frame for each eye, encoding module 212 could reduce the required information for encoding by creating a difference map between the right and left eye and encoding just the right eye and using a difference map to reconstruct the left during playback via stream decode module 134 on HMD 130.

Accordingly, once the master video file is appropriately encoded for video, the master video file can be split into chunks (e.g., approximately 0.125 to 2 sec corresponding to 10-60 frames at once) with the synchronized video, audio, subtitles, distortion map for the tiles, displacement or difference map for stereo reconstruction as well as stereo disparity map appropriate for each chunk ready for serving by streaming module 126.

Streaming

Streaming module 126, in one embodiment, communicates with HMD 130 to deliver the master video file to HMD 130. Streaming module 126, in one embodiment, includes communications module 214, stream determination module 216, and feedback module 218, as shown in FIG. 2. Streaming module 126 could be part of production system 120 or located remotely with one or more streaming servers.

Stream determination module 216, in one embodiment, determines the quality and/or what tiles of the one or more frames to provide HMD 130. Communication module 214 receives the multiple inputs and provides data associated with one or more of the multiple inputs to stream determination module 216. The inputs may include network bandwidth, the expected head motion or viewing location, and playback time, and so forth and stream determination module 216 determines what tiles to compress (e.g., decimate, blur, filter, etc.), as discussed above with respect to data reduction module 210. For example, based on the user's head and/or eye position(s) determined by one or more sensors in HMD 130, stream determination module 216 may define a center tile corresponding to where the user is looking (i.e., viewing location) within the content to prioritize the quality of the center tile to provide the content at a relatively high quality and, based on network bandwidth (and/or other considerations), determine a transfer function for compressing the tiles other than the center tile.

HMD 130 may manage buffering of each chunk of frames, caching resources locally that cover the FOV determined by positional tracking supplied by HMD 130, and then decoding the video data, audio data, subtitle data for each frame, displacement map, stereo information, and auxiliary information for user interaction and optionally applying sharpening, and a HMD color transform (if appropriate to the local device) before final display to the user. While presenting content, HMD 130 may additionally applying various techniques to hide the substitution of tiles by transitioning from one tile to another using, for example, a moving line describing the overlap (e.g., a wipe in video transition) or with a dissolve or fade between sources on HMD 130 to remove the differences in scene content between multiple streams while a user's head is in motion and while HMD 130 is receiving substitute frames to cover the current FOV.

Based on instructions from the content creator (e.g., embedded as metadata), the content insertion module 207 may switch in, add, or update content of the master video file with a new file package or content. The new content could, in one embodiment, be an advertisement or other message that comes into view via the master video file as the user is viewing the content of the master video file. Content insertion module 207 may achieve this by adding a file package to pre-created or filler content. For example, frames of the master video file may include template locations (e.g., blank billboards that can be seen in the background, product labels, designs on a T-shirt, etc.) and new content can be added into a template location from a stream based on information known about the user or by updating an advertisement created for a new season or campaign. The added content could also be triggered by a user interaction within the content of the master video file. The trigger may come from an input device of HMD 130 or hand-held device such as a wand, touch device, or gamepad. The new content may be composited into a tile and generated in real-time or during streaming from command instructions added by the content creator.

Further, while streaming, encoding module 212 may package new data streams that are dependent on user triggers. The new data streams are then inserted at playback time on HMD 130. The new data streams can be overlays that convey new data as part of the video experience shown by HMD 130 while packaged as auxiliary data by encoding module 212. The auxiliary data can, for example, be user interface elements, subtitles, or text annotation of specific scene content. This auxiliary data that may change depending on the player interaction or other data from the HMD.

Feedback module 218 receives content playback information from analytic data module 138 of HMD 130. As mentioned above, analytic data module 138 of HMD 130 iteratively engages production system 120 with a machine learning process to facilitate the delivery and correct specification of the master video file to HMD 130 and feedback module 218 stores these interactions for later analysis and analytic reprocessing, to determine where or at what within the content users are looking at, among other processes.

Data Reduction Based on Selective Motion Areas

As described above, in order to lower the amount of data sent to encoding module 212, data reduction module 210, in one embodiment, processes the master video file into tiles and compresses the tiles as a function of position relative to a center tile.

FIGS. 3*a-b* are flow charts showing methods of identifying viewing trends and predicting viewing locations based on those trends to enhance the user's field of view in accordance with an embodiment. As described above, the center tile, in this embodiment, corresponds to either a determined or predicted viewing location of the user wearing HMD 130 that will change as the user moves his head and/or eyes to view additional content of the master video file. The center tile may be located at the center of the display of the HMD. The center tile may not be compressed at all (or slightly depending on network bandwidth and HMD 130 capabilities) and the other tiles are decimated as a function of distance from the center tile. In this manner, the tile corresponding to the viewing location of the user is prioritized and provided in high quality, while tiles where the user isn't looking are compressed. Since the human eye requires time to adjust and would likely not be able to focus on an object with enough particularity having, for example, just turned their head, tiles other than the center tile can be initially provided at a lower quality in order to reduce bandwidth for example. Accordingly, when the user moves their head and/or eyes, the center tile is updated and the new center tile is provided at a high quality relative to the other tiles including a previous center tile, in this example.

In an embodiment, the center tile is predicted at various times based on a user profile/user characteristics and information about viewing trends from many previous viewers. Predicting the center tile enables the production system 120 to prepare a video stream with this predicted center tile and stream it to the HMD 130 so that when the time in the video corresponding to the prediction occurs it is more likely that the HMD will have a high quality video centered around the portion of the scene at which the viewer is looking. If the prediction is incorrect, the HMD 130 provides the actual position to the production system 120 at which the viewer is looking and the ongoing video is prepared and streamed based on the actual position. If a prediction is made about a future time, the process repeats.

With reference to FIG. 3a, for a video, information about user characteristics, e.g., age, gender, preferences, interests (e.g., hiking, skiing, etc.), hobbies, preferences (e.g., color, foods, beverages, etc.), previous viewing information (e.g., user behavior on a platform, etc.), device preference (e.g., PC, Mac, type of smartphone, etc.), location frequency of consumption/playing, behavioral characteristics (e.g., relative to the behavior of others using systems), etc. are identified and the location that the viewer is observing during the video is identified. An HMD 130 identifies 304 the location where the user is looking while viewing the video stream by, for example, identifying the user's head and eye positions through convention sensors on the HMD 130. HMDs 130 (it may be hundreds/thousands or more HMDs) transmit 306 this information to a production system 120. The production system 120 stores the information, e.g., in data store 128, and analyzes the data from many users/HMDs 130 to identify 308 viewing trends for the video based. The analysis may also identify viewing trends based on user characteristics, e.g., the age and gender of the user. The viewing trends are stored 310.

With reference to FIG. 3b, when a user is viewing the video, the production & post production module 122 receives 320 the user's profile information and identifies 322 the predicted viewing location of the user at particular times during the video using the identified trends (for example in step 308) based on where previous users/viewers, who have a profile or characteristics similar to the user, were looking at the particular times during the video. The production & post production module 122 identifies the center tile as the predicted viewing location at a particular time for the user and prepares and encodes 324 the video stream based on the predicted viewing location and, for example, streams the video to the HMD in which the predicted viewing location is the center tile at the associated time in the video. The actual viewing location of the user at each time can be feedback by the HMD 130 to the feedback module 218 and can be used as another set of data points for use by the prediction module.

Figure 4:
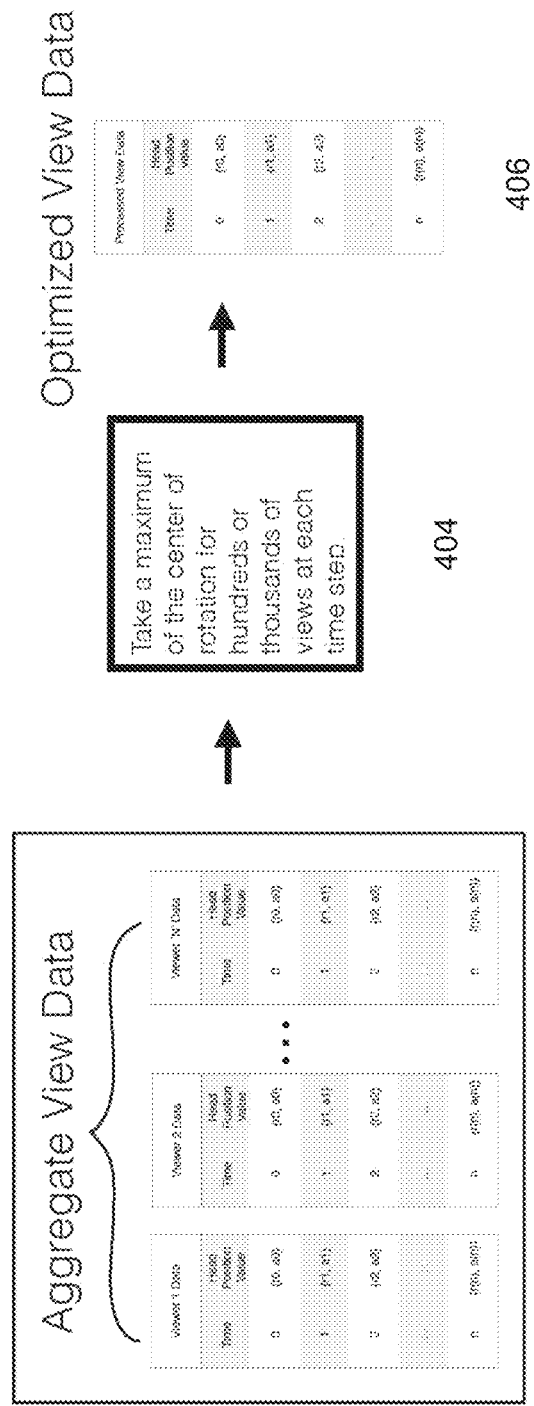
FIG. 4 illustrates the data process for a field of use optimization in accordance with an embodiment.

FIG. 4 illustrates the data process for a field of use optimization in accordance with an embodiment. In embodiments, data from hundreds or thousands (or more) of users are aggregated 402. The data includes information about a user, e.g., the user profile, and information about the location the user is looking at various times during the video. For any particular profile, characteristic or combination of characteristics, e.g., an 18 year old male, the production system 120 (or a prediction module, not shown) determines a location that users having similar characteristics were viewing at various times in the video. In one embodiment, a maximum of the center of rotation for all of the many users with the identified characteristics is identified 404 at each time or particular times of the video. Alternate methods for identifying the center may be used. For example, a position having the most views that are within a first distance may be identified as the prediction location. In alternate embodiment this could be based on aggregate clustering of the many locations to encompass not just a center but an overall region. This identified region could be further correlated with the subject and object in the region by using labels in a master file as one example. For example, the subject or object in the region may correspond to a person, animal, object such as train, chair, toy, etc. The predicted locations for each profile, characteristic and/or group of characteristics are identified 406 using the above described analysis, e.g., a cluster analysis and stored for use in future predictions. The time that prediction occurs can be based on the results of the analysis of previous users. Those times that have a relatively high likelihood of having a view with particular characteristics looking at a particular location in the video may be identified as strong candidates for predictions.

Figure 5A:
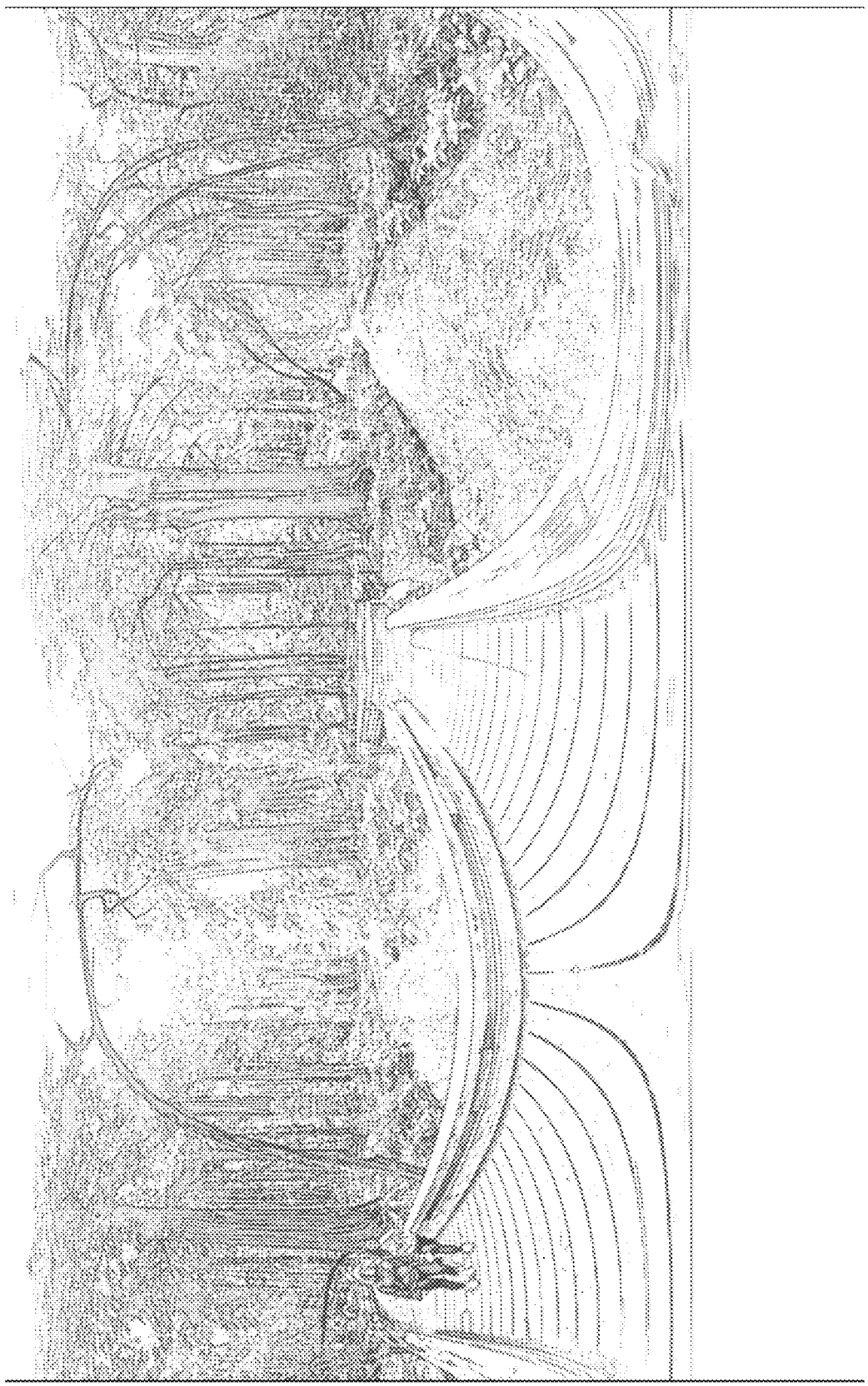
FIGS. 5a-e are illustrations showing an example of the field of use optimization in accordance with an embodiment.
Figure 5B:
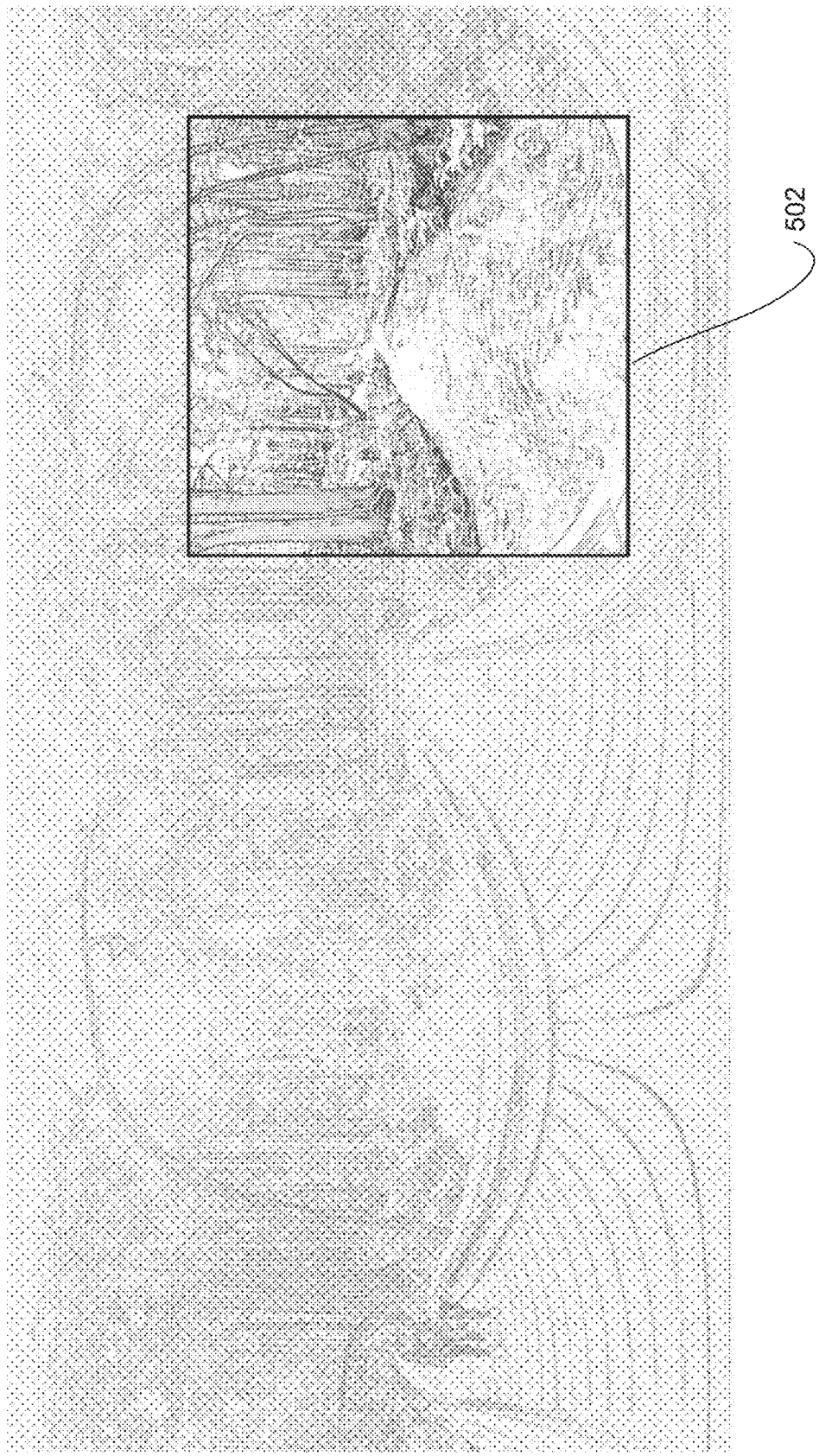
Figure 5C:
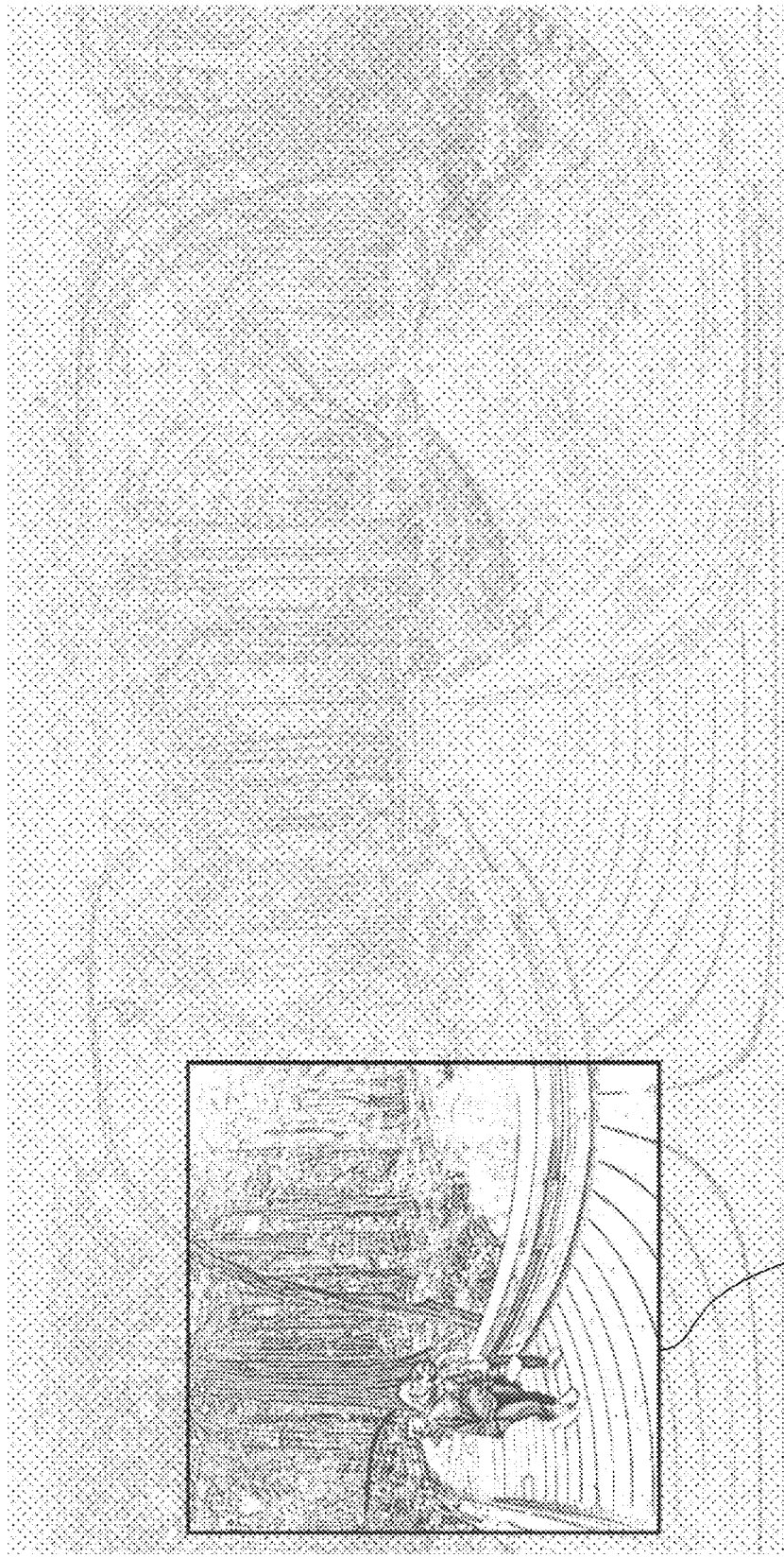
Figure 5D:
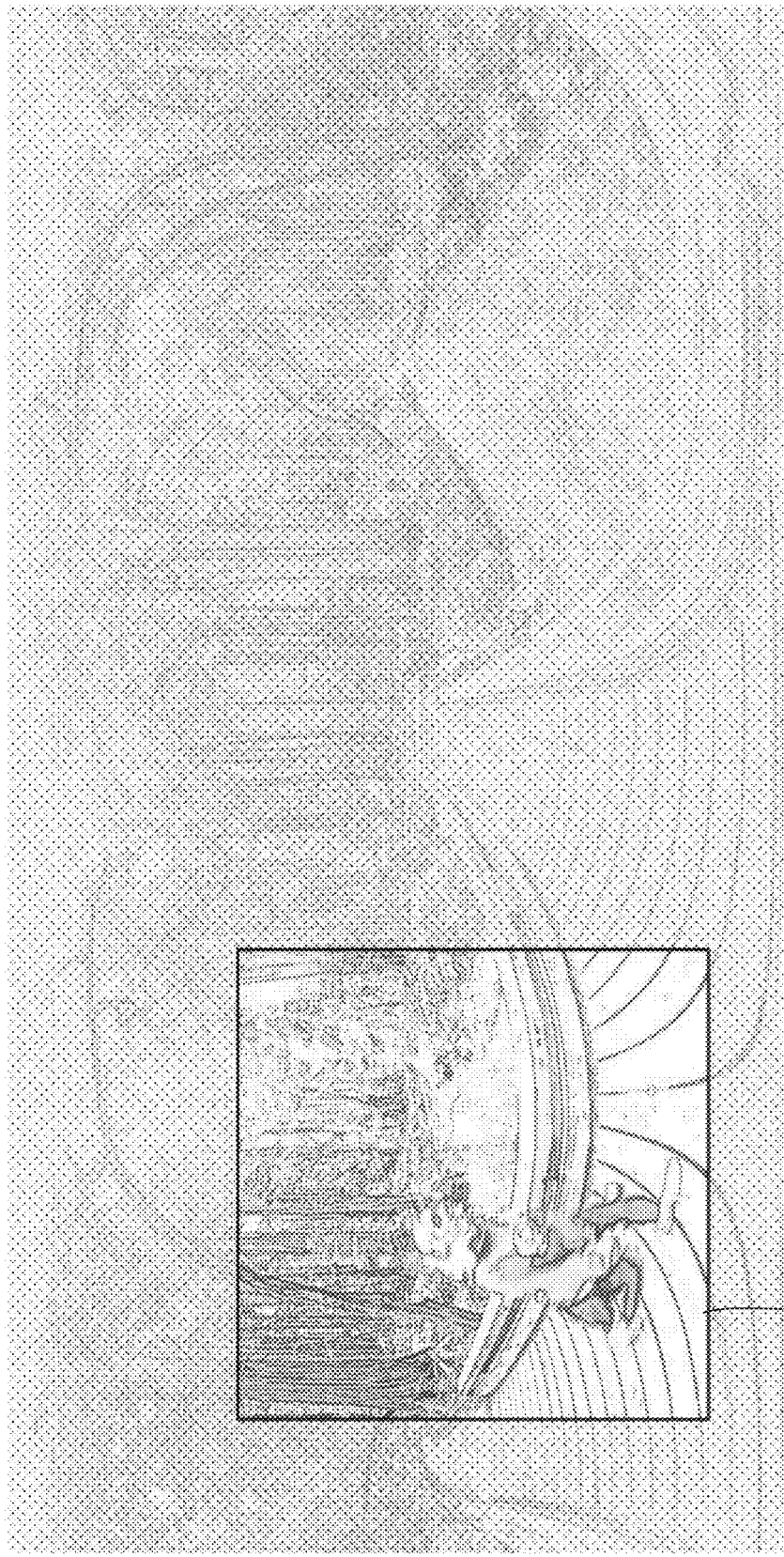
Figure 5E:
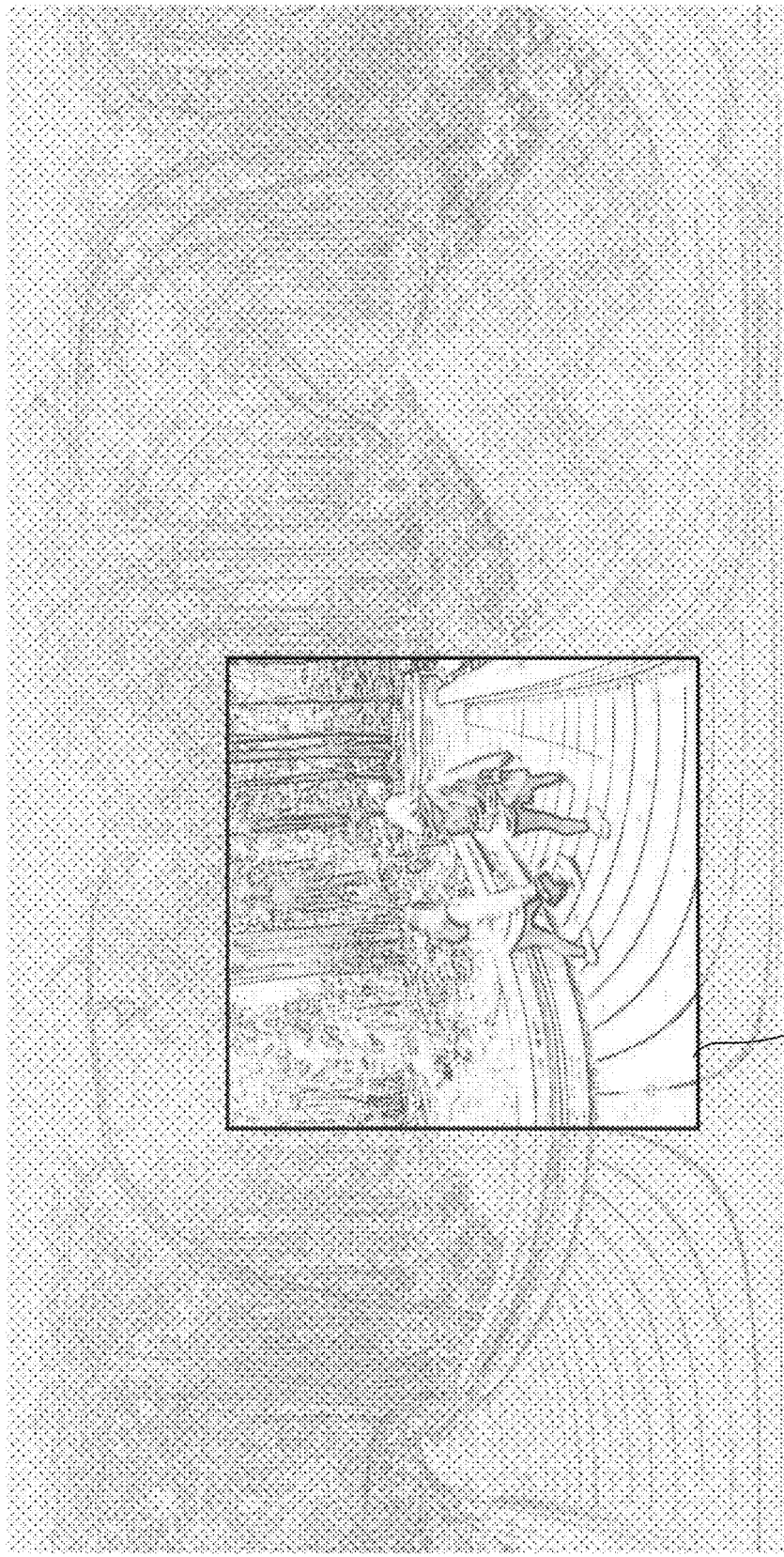

FIGS. 5a-e are illustrations showing an example of the field of use optimization in accordance with an embodiment. FIGS. 5a-e shows a scene with two people walking through the woods. FIG. 5a represents the scene. FIG. 5b represents the scene at time T0. The user is looking at a portion 502 at the right side of the scene. The center tile is within this portion 502. Based on data from previous users, the production system predicts that at time T1 (FIG. 5c) the user's head will move to the center of portion 504. The production system 120 identifies the center tile as within portion 504. The remaining/shaded portion is still sent to the HMD 130, although at a lower resolution, as described above. Similarly the production system predicts that at time T2 (FIG. 5d) the user's head will move to the center of portion 506. The production system 120 identifies the center tile as within portion 506. At time T3 (FIG. 5e) the production system predicts the user's head will move to the center of portion 508. The production system 120 identifies the center tile as within portion 508.

Figure 6A:
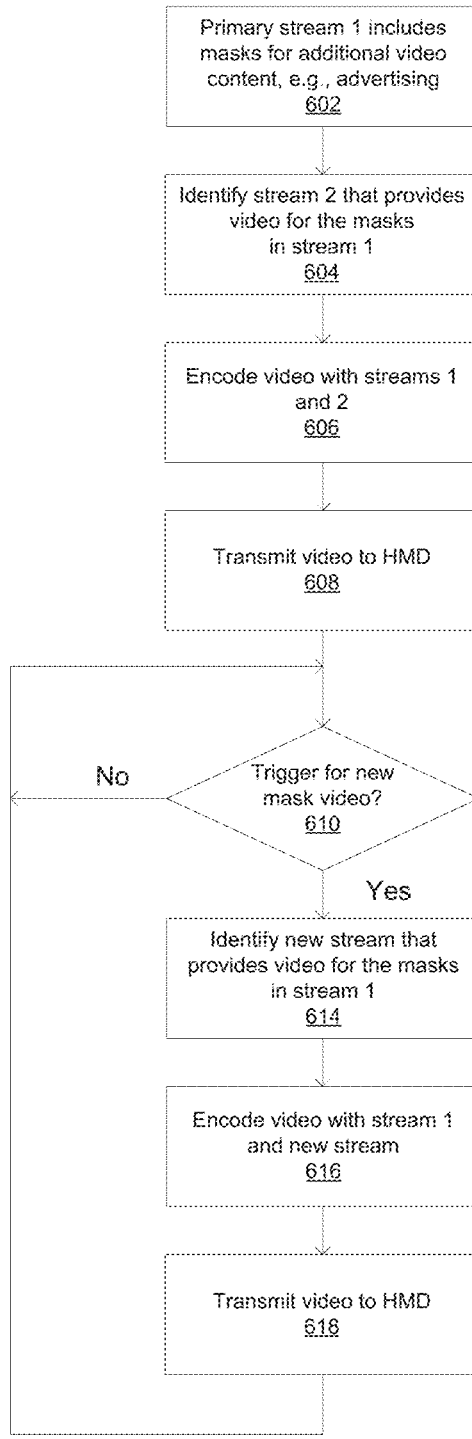
FIGS. 6a-c are flowcharts showing alternative embodiments of changing a portion of the content displayed.
Figure 6B:
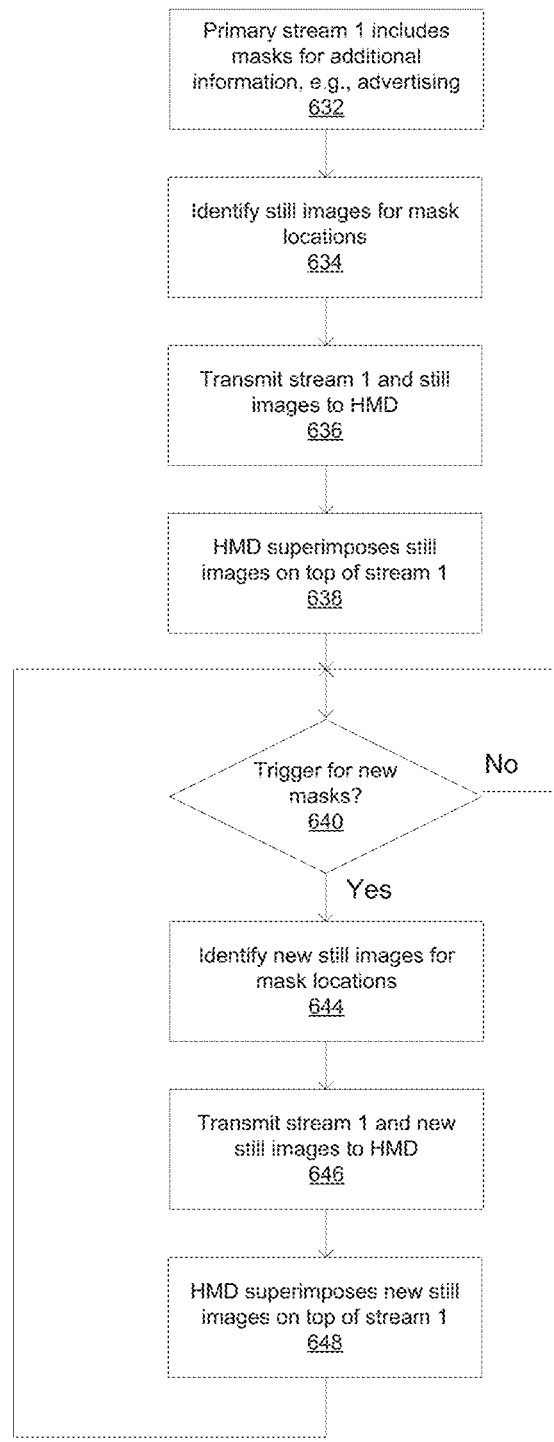
Figure 6C:
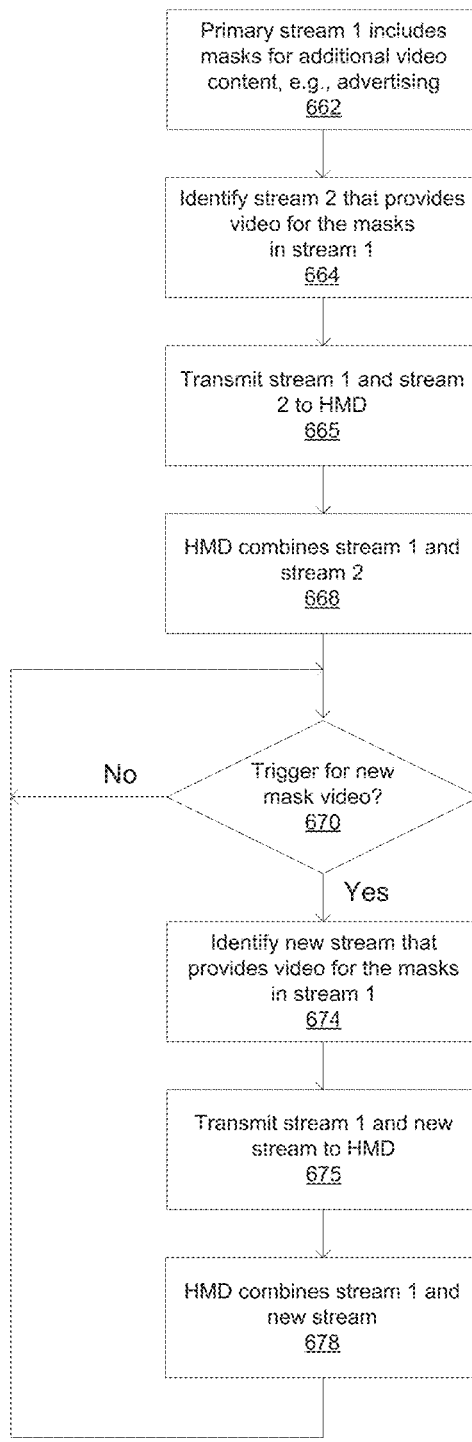

FIGS. 6a-c are flowcharts showing alternative embodiments for changing a portion of the displayed content. As described above, based on instructions from the content creator (e.g., embedded as metadata), the content insertion module 207 may switch in, add, or update content of the master video file with a new file package or content. The new content could, in one embodiment, be an advertisement or other message that comes into view via the master video file as the user is viewing the content of the master video file. Content insertion module 207 may achieve this by adding a file package to pre-created or filler content. For example, frames of the master video file may include template locations (e.g., blank billboards that can be seen in the background, product labels, designs on a T-shirt, etc.) and new content can be added into a template location from a stream based on information known about the user, e.g., based on a user profile, or by updating an advertisement created for a new season or campaign. The added content could also be triggered by a user interaction within the content of the master video file. The trigger may come from an input device of HMD 130 or hand-held device such as a wand, touch device, gamepads, or non-physical devices, e.g., virtual pointers based on physical motion (such as hand tracking, eye signals (number of blinks), body motion, body position (e.g., arm position relative to body, head position relative to arm, etc.) facial expressions, etc.). The new content may be composited into a tile and generated in real-time or during streaming from command instructions added by the content creator.

Further, while streaming, encoding module 212 may package new data streams that are dependent on user triggers. The new data streams are then inserted at playback time on HMD 130. The new data streams can be overlays that convey new data as part of the video experience shown by HMD 130 while packaged as auxiliary data by encoding module 212. The auxiliary data can, for example, be user interface elements, subtitles, or text annotation of specific scene content. This auxiliary data that may change depending on the player interaction or other data from the HMD 130.

There are a variety of ways in which the additional content is combined with the primary video stream. Some examples are described with reference to FIGS. 6a-c. With reference to FIG. 6a, a primary stream 1 includes 602 masks that can be filled in by additional video content. A second stream (stream 2) is identified or received 604 that provides video/content for the masks in primary stream 1. The production and post-processing module 122 creates a master negative and then a master video file by combining, e.g., overlaying, stream 2 on primary stream 1. The master video is encoded 606 and transmitted 608 to the HMD 130. If there is no trigger 610, the process continues. As described above, a trigger is an indication that new secondary content is to be combined with the primary stream. When a trigger occurs 610 (by the content creators or a user, for example) a new secondary stream is identified 614. As described above, this secondary stream may have new content, such as a new seasonal advertising campaign or a new advertisement for the user. The production and post-processing module 122 creates a master negative and then a master video file by combining, e.g., overlaying, the new secondary stream on primary steam 1. The master video is encoded 616 and transmitted 618 to the HMD 130.

With reference to FIG. 6b, a primary stream 1 includes 632 masks that can be filled in by additional video content. Still images are identified 634 that provide video/content for the masks in primary stream 1. The primary stream 1 and the still images are transmitted 636 to the HMD 130. The HMD 130 superimposes 638 the still images on top of the content of stream 1. If there is no trigger 640, the process continues. When a trigger occurs 640 new still images are identified 644 that provide video/content for the masks in primary stream 1. The primary stream 1 and the new still images are then transmitted 646 to the HMD 130. The HMD superimposes 648 the still images on top of the content of stream 1.

In an embodiment the still images can be re-encoded into the primary steam in a manner similar to the process described with reference to FIG. 6a.

When the HMD 130 has sufficient processing power the procedure set forth in FIG. 6c may be used. A primary stream 1 includes 662 masks that can be filled in by additional video content. A second stream (stream 2) is identified or received 664 that provides video/content for the masks in primary stream 1. Stream 1 and stream 2 are encoded separately and transmitted 665 to the HMD 130. The HMD creates 668 a final stream by combining a background stream 1 with an overlay stream 2 to generate a final stream 3. If there is no trigger 670, the process continues. When a trigger occurs 670 a new secondary stream is identified 674 that provides video content for the masks in stream 1. As described above, this secondary stream may have new content, such as a new seasonal advertising campaign or a new advertisement for the user. Stream 1 and the new stream are encoded separately and transmitted 675 to the HMD 130. The HMD creates 678 a master negative and then a master video file by combining, e.g., overlaying, the new stream on primary stream 1.

For ease of description, these examples are described with reference to one primary video and a secondary video/stills. Any number of primary and secondary videos/stills can be used with new content being modified for any one or combination of the videos.

Figure 7:
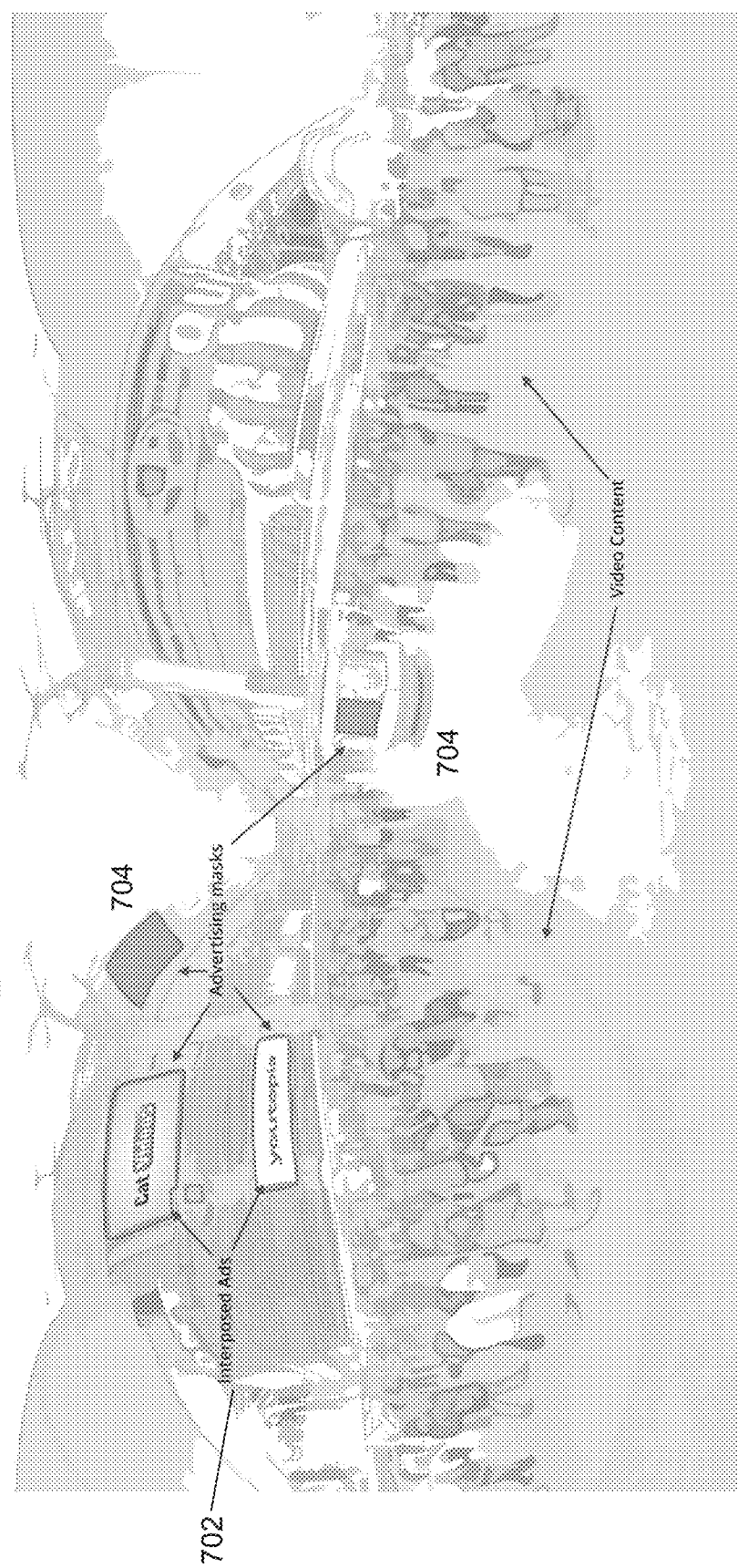
FIG. 7 is an example showing how content in a stream is updated in accordance with an embodiment.

FIG. 7 is an example showing how content in a stream is updated in accordance with an embodiment. The primary stream 700 depicts a crowd in a large indoor facility. The primary stream includes masks 702, 704 that are blank. As described above, content is included in one or more secondary streams (e.g., stream 2) or still images, for example, that can fill in the masks. In this example, the masks are advertisements and the secondary stream(s) include the advertisements 704 for CatVideos and youtopia. Additional streams (not shown) may include content for masks 702 that are blank in FIG. 7.

Additional Configuration Information

Reference in the specification to "one embodiment" or to "an embodiment" means that a particular feature, structure, or characteristic described in connection with the embodiments is included in at least one embodiment. The appearances of the phrase "in one embodiment" or "an embodiment" in various places in the specification are not necessarily all referring to the same embodiment.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations or transformation of physical quantities or representations of physical quantities as modules or code devices, without loss of generality.

However, all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "determining" or the like, refer to the action and processes of a computer system, or similar electronic computing device (such as a specific computing machine), that manipulates and transforms data represented as physical (electronic) quantities within the computer system memories or registers or other such information storage, transmission or display devices.

Certain aspects of the embodiments include process steps and instructions described herein in the form of an algorithm. It should be noted that the process steps and instructions of the embodiments can be embodied in software, firmware or hardware, and when embodied in software, could be downloaded to reside on and be operated from different platforms used by a variety of operating systems. The embodiments can also be in a computer program product which can be executed on a computing system.

The embodiments also relate to an apparatus for performing the operations herein. This apparatus may be specially constructed for the purposes, e.g., a specific computer, or it may comprise a computer selectively activated or reconfigured by a computer program stored in the computer. Such a computer program may be stored in a computer readable storage medium, such as, but is not limited to, any type of disk including floppy disks, optical disks, CD-ROMs, magneto-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Memory can include any of the above and/or other devices that can store information/data/programs and can be transient or non-transient medium, where a non-transient or non-transitory medium can include memory/storage that stores information for more than a minimal duration. Furthermore, the computers referred to in the specification may include a single processor or may be architectures employing multiple processor designs for increased computing capability.

The algorithms and displays presented herein are not inherently related to any particular computer or other apparatus. Various systems may also be used with programs in accordance with the teachings herein, or it may prove convenient to construct more specialized apparatus to perform the method steps. The structure for a variety of these systems will appear from the description herein. In addition, the embodiments are not described with reference to any particular programming language. It will be appreciated that a variety of programming languages may be used to implement the teachings of the embodiments as described herein, and any references herein to specific languages are provided for disclosure of enablement and best mode.

In addition, the language used in the specification has been principally selected for readability and instructional purposes, and may not have been selected to delineate or circumscribe the inventive subject matter. Accordingly, the disclosure of the embodiments is intended to be illustrative, but not limiting, of the scope of the embodiments, which is set forth in the claims.

While particular embodiments and applications have been illustrated and described herein, it is to be understood that the embodiments are not limited to the precise construction and components disclosed herein and that various modifications, changes, and variations may be made in the arrangement, operation, and details of the methods and apparatuses of the embodiments without departing from the spirit and scope of the embodiments.

What is claimed is:

1. A method for encoding a first video stream, comprising the steps of:
    storing viewing trends for a plurality of users, the viewing trends corresponding to where each of the plurality of users was looking during a video stream at a particular time, wherein each user of the plurality of users is associated with a set of user characteristics including user preferences, user interests, and previous content viewing information;
    identifying a first set of user characteristics for a first user viewing a first video stream;
    identifying a subset of the plurality of users who viewed the first video stream and who share at least a threshold amount of user characteristics in common with the first set of user characteristics for the first user, the stored viewing trends for the subset of the plurality of users identifying where in the first video stream each user of the subset was looking at particular times;
    predicting, based on the stored viewing trends for the subset of the plurality of users and content within the first video stream, a predicted viewing location for the first user at a first time of the first video stream; and
    encoding a first portion of the first video stream based upon the predicted viewing location.

2. The method of claim 1, wherein said encoded first portion of the first video stream includes said first time of the first video stream.

3. The method of claim 1, wherein said predicted viewing location is the location in the first video stream where the first user is predicted to look during said first time.

4. The method of claim 3, wherein said predicted viewing location is identified as a center tile and wherein said encoding step encodes said predicted viewing location using a lower compression rate than a second location of said video stream at said first time.

5. The method of claim 1, wherein said predicting step comprises:
    identifying a second set of characteristics corresponding to said first set of characteristics; and
    identifying said predicted viewing location, based on previous viewing locations for the first video stream at said first time by users having said second set of characteristics.

6. The method of claim 5, wherein said first and second set of characteristics are the same.

7. The method of claim 5, further comprising the step of:
    identifying an actual viewing location of said first user at a first time of the first video stream; and
    including said actual viewing location as a previous viewing location for subsequent users who subsequently view the first video.

8. A non-transitory computer-readable medium storing instructions for execution on a processor, the instructions when executed by the processor causing the processor to perform the steps of:
    storing viewing trends for a plurality of users, the viewing trends corresponding to where each of the plurality of users was looking during a video stream at a particular time, wherein each user of the plurality of users is associated with a set of user characteristics including user preferences, user interests, and previous content viewing information;
    identifying a first set of user characteristics for a first user viewing a first video stream;
    identifying a subset of the plurality of users who viewed the first video stream and who share at least a threshold amount of user characteristics in common with the first set of user characteristics for the first user, the stored viewing trends for the subset of the plurality of users identifying where in the first video stream each user of the subset was looking at particular times;
    predicting, based on the stored viewing trends for the subset of the plurality of users and content within the first video stream, a predicted viewing location for said first user at a first time of the first video stream; and
    encoding a first portion of the first video stream based upon the predicted viewing location.

9. The computer readable medium of claim 8, wherein said encoded first portion of the first video stream includes said first time of the first video stream.

10. The computer readable medium of claim 8, wherein said predicted viewing location is the location in the first video stream where the first user is predicted to look during said first time.

11. The computer readable medium of claim 10, wherein said predicted viewing location is identified as a center tile and wherein said encoding step encodes said predicted viewing location using a lower compression rate than a second location of said video stream at said first time.

12. The computer readable medium of claim 8, wherein said predicting step comprises:
    identifying a second set of characteristics corresponding to said first set of characteristics; and identifying said predicted viewing location, based on previous viewing locations for the first video stream at said first time by users having said second set of characteristics.

13. The computer readable medium of claim 12, wherein said first and second set of characteristics are the same.

14. The computer readable medium of claim 12, further comprising the step of:
identifying an actual viewing location of said first user at a first time of the first video stream; and
including said actual viewing location as a previous viewing location for subsequent users who subsequently view the first video.

\* \* \* \* \*